(12) United States Patent
Hall et al.

(10) Patent No.: US 11,648,628 B2
(45) Date of Patent: *May 16, 2023

(54) METHOD FOR MATCHING AND TRACKING WORKPIECES IN LASER ETCHING OPERATION

(71) Applicant: Shutterfly, LLC, Redwood City, CA (US)

(72) Inventors: David Lynn Hall, Charlotte, NC (US); Michael Lane Polk, Mint Hill, NC (US); Gregory Lee Franklin, Indian Trail, NC (US)

(73) Assignee: Shutterfly, LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/841,017

(22) Filed: Jun. 15, 2022

(65) Prior Publication Data

US 2022/0379407 A1 Dec. 1, 2022

Related U.S. Application Data

(63) Continuation of application No. 16/916,533, filed on Jun. 30, 2020, now Pat. No. 11,389,904, which is a continuation-in-part of application No. 16/123,821, filed on Sep. 6, 2018, now Pat. No. 10,703,122, which (Continued)

(51) Int. Cl.
*B23K 26/362* (2014.01)
*B23K 26/06* (2014.01)
*B23K 26/08* (2014.01)
*G06T 1/00* (2006.01)
*G06T 7/00* (2017.01)
*B23K 37/04* (2006.01)

(52) U.S. Cl.
CPC ........ *B23K 26/362* (2013.01); *B23K 26/0626* (2013.01); *B23K 26/0876* (2013.01); *B23K 37/0426* (2013.01); *G06T 1/0014* (2013.01); *G06T 7/0004* (2013.01); *G06T 2207/30164* (2013.01)

(58) Field of Classification Search
CPC .................................................... B23K 26/362
See application file for complete search history.

(56) References Cited

U.S. PATENT DOCUMENTS

| 8,733,868 B1 | 5/2014 | Polk et al. |
| 2010/0272961 A1 | 10/2010 | Costin |
| 2017/0320348 A1* | 11/2017 | Hall ........................ B44C 1/228 |

* cited by examiner

*Primary Examiner* — Yung-Sheng M Tsui
(74) *Attorney, Agent, or Firm* — Merchant & Gould P.C.

(57) ABSTRACT

A method for matching and tracking workpieces in laser etching operation includes generating by the computer a label image that uniquely identifies the workpiece, moving a laser head to the workpiece, setting the laser head to a first power level by a power controller, etching the product image on the workpiece using a laser beam emitted from the laser head, wherein the laser beam is modulated at the first power level in accordance with a product image in a pixel wise fashion across the workpiece, moving the laser head to the label by the transport mechanism, setting the laser head to a second power level by the power controller, etching the label image on the workpiece using a laser beam emitted from the laser head, wherein the laser beam is modulated at the second power level in accordance with the label image in a pixel wise fashion across the label.

20 Claims, 7 Drawing Sheets

Related U.S. Application Data is a continuation-in-part of application No. 15/146,827, filed on May 4, 2016, now abandoned.

METHOD FOR MATCHING AND TRACKING WORKPIECES IN LASER ETCHING OPERATION

CROSS-REFERENCE TO RELATED APPLICATIONS

This application is a continuation of U.S. application Ser. No. 16/916,533, U.S. Pat. No. 11,389,904, filed on Jun. 30, 2020, and issued on Jul. 19, 2022, which is a continuation-in-part of U.S. application Ser. No. 16/123,821, U.S. Pat. No. 10,703,122, filed on Sep. 6, 2018, and issued on Jul. 7, 2020, which is a continuation-in-part of U.S. application Ser. No. 15/146,827, filed on May 4, 2016, the disclosures of which are hereby incorporated by reference in their entireties. To the extent appropriate a claim of priority is made to each of the above-disclosed applications.

BACKGROUND OF THE INVENTION

The present application relates generally to technologies for producing customized images on workpieces, and in particular, to a system and method for decorating consumer products using laser etching.

In recent years, the popularization of digital media and digital printing technologies has created great demands for consumer products decorated with customized images. Most of such customized images are printed by digital printers with colorants such as inks or dyes. Some objects, however, are not suitable for receiving inks or dyes. Some other objects are aesthetically more appealing if the images are directly engraved, carved, or etched on their surfaces without using colorants. Such objects can be made of materials such as glass, plastic, wood, stone, metal, laminates, leather or faux leathers, vinyl, composite materials, etc.

Laser etching can produce customized image patterns on objects without the use of colorants. One or more workpieces can be placed in a laser etching apparatus and etched in a batch. In some workflows for decorating custom products, each item is considered a unique order by an individual customer. It is difficult to keep track of the workpieces once they are removed from the laser etching apparatus using the current manufacturing process. While the blank work pieces may have the same shape and may be made of the same materials, the customized images are usually different and are chosen by different customers. Since the finished products are often placed on desks and coffee tables for decorations, it is undesirable to etch or print product tracking numbers or codes directly on the workpieces. Thus, it is easy to mix up workpieces once they are moved from the laser etching apparatus.

Figure 1:
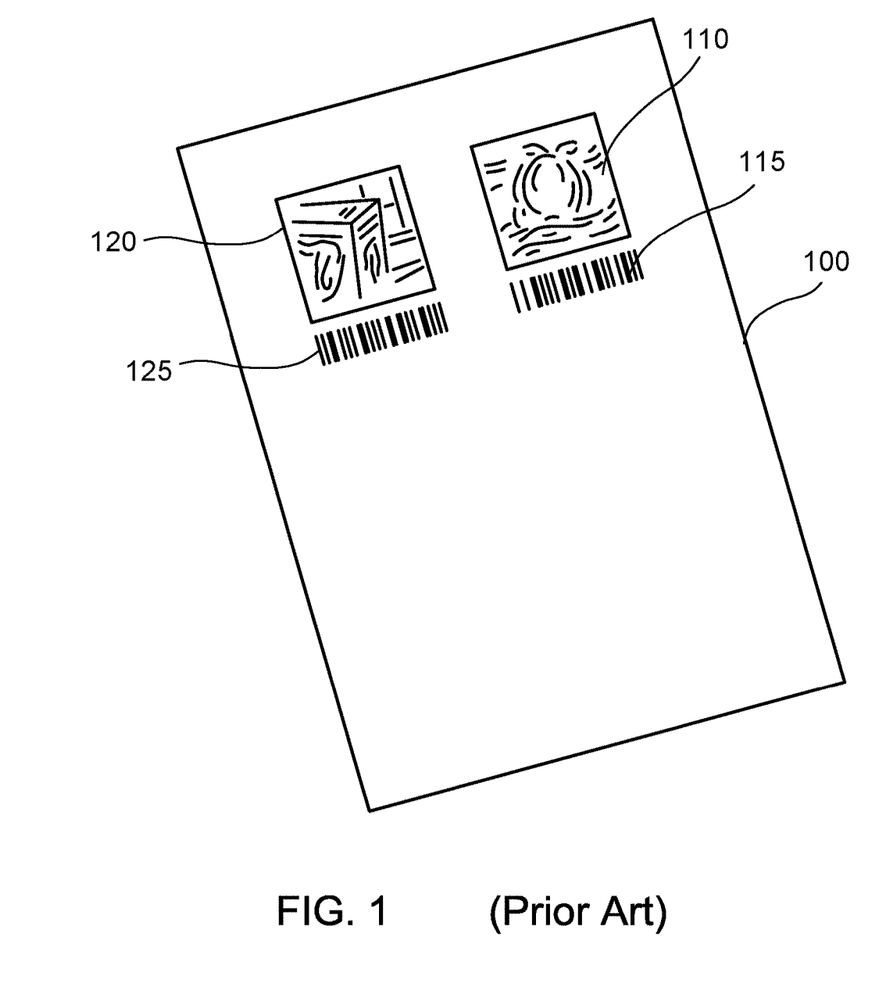
FIG. 1 illustrates a job ticket printed by a separate printer in a conventional laser etching workflow.

Referring to FIG. 1, currently product tracking labels are printed on a job ticket 100 (i.e. which can be an 8.5" by 11" paper) sheet using a separate printer such as a laser printer and an ink jet printer. Thumbnail images 110 and 120 that mimic the input digital images are printed on the job ticket 100 by the laser printer or the ink jet printer. The thumbnail images 110 and 120 respectively reproduce the image patterns on the workpieces. In addition, product codes 115, 125 that respectively uniquely identify the workpieces (FIG. 1) are also printed respectively adjacent to the thumbnail images 110 and 120. The job ticket 100 is then separated to smaller workpiece tracking labels each corresponding to a workpiece. After the workpieces are moved from the laser etching apparatus, the tracking labels are paired up with the workpieces, to be moved together throughout the rest of the manufacturing steps (e.g. optional in-line processing, up-sale items, packaging, shipping, etc.).

A drawback for the current manufacturing process is that the workpiece tracking labels are printed by different printers, which adds complexity, labor, and cost to the manufacturing process. Another drawback for the current manufacturing process is that the pairing of the workpiece tracking labels and the workpieces can be error-prone because the workpieces and their corresponding tracking labels are paired manually and must be matched together visually.

There is therefore a need for a simpler, less labor intensive, and lower cost solution for manufacturing workpieces using laser etching.

SUMMARY OF THE INVENTION

The present application discloses a system and method that address the above-described drawbacks in the conventional manufacturing practices. The disclosed system and method are simpler, more accurate and less error-prone, and are especially beneficial and provide higher throughput for etching a large number of workpieces in a batch. Moreover, the disclosed system and method are implemented by using existing capital equipment while eliminating the need for separate tracking label printers.

In one general aspect, the present invention relates to a laser etching system for forming customized image patterns on workpieces. The etching system includes a computer configured to receive a product image to be reproduced on a workpiece by laser etching and to generate a label image that uniquely identifies the workpiece; a laser head that can emit a laser beam; a transport system configured to scan the laser head across a workpiece or a label associated with the workpiece; a laser head driver that can modulate the laser beam in accordance to the product image or the label image; and a power controller that can set a first power level or a second power level of the laser beam at the laser head driver, wherein the laser head scans across the workpiece to etch the workpiece at the first power level in pixel-wise fashion to reproduce the product image on the workpiece, wherein the laser head scans across a label to etch the label at the second power level in pixel-wise fashion to reproduce the label image on the label.

Implementations of the system may include one or more of the following. The laser etching system can further include an image processor image processor configured to produce a composite image comprising a plurality of product images and a plurality of label images associated with the plurality of product images, wherein a plurality of workpieces and a plurality of label holders carrying associated labels can be placed on a platform. The composite image includes a first image plane and a second image plane, wherein the plurality of product images are stored in the first image plane, wherein the plurality of label images are stored in the second image plane, wherein the first image plane and the second image plane are respectively associated with the first power level and the second power level of the laser beam. The power controller can set the first power level of the laser beam at the laser head driver to reproduce the product images stored in the first image plane on the plurality of workpieces, wherein the power controller can set the second power level of the laser beam at the laser head driver to reproduce the label images stored in the second image plane on the plurality of labels. The plurality of product images and the plurality of label images can be stored in a common image plane, wherein the power controller can dynamically set power level of the laser beam at the laser head driver before the laser head scans across the plurality of workpieces or the plurality of labels. The transport system can scan the laser head across the platform line by line, wherein the power controller dynamically sets power level of the laser beam at the laser head driver within each line before the laser head scans across one of the plurality of workpieces or one of the plurality of labels. The laser etching system can further include a transport controller that can control the transport mechanism to move the laser head over the workpiece and the label, and to scan the workpiece and the label to allow the product image and the label image to be respectively reproduced on the workpiece and the label by laser etching. The laser etching system can further include a platform on which the work piece and a label holder are placed. The label can be attached to a top surface of the label holder, where the label image is printed on a top surface of the label holder. The label can be attached to the top surface of the label holder by a retainer, or by vacuum suction, or by an adhesive backing on back surface of the label. A plurality of workpieces and a plurality of the label holders can be placed in pairs on the platform, wherein each of the plurality of label holders is configured to hold a label image to track the one of the plurality of workpieces in the same pair.

In another general aspect, the present invention relates to a method for laser etching customized image patterns on workpieces. The method includes receiving a product image by a computer, wherein the product image is to be reproduced on a workpiece by laser etching; generating, by the computer, a label image that uniquely identifies the workpiece, wherein the workpiece and the label are placed over a platform in a laser etching apparatus; moving a laser head to the workpiece by a transport mechanism; setting the laser head to a first power level by a power controller; while scanning the laser head across the workpiece, etching the product image on the workpiece using a laser beam emitted from the laser head, wherein the laser beam is modulated at the first power level in accordance with the product image in a pixel wise fashion across the workpiece; moving the laser head to the label by the transport mechanism; setting the laser head to a second power level by the power controller; and while scanning the laser head across the workpiece, etching the label image on the workpiece using a laser beam emitted from the laser head, wherein the laser beam is modulated at the second power level in accordance with the label image in a pixel wise fashion across the label.

Implementations of the system may include one or more of the following. The method can further include moving the laser head from a home position over the platform of the laser etching apparatus to the workpiece or the label. The method can further include producing, by a label and product image processor, a composite image comprising a plurality of product images and a plurality of label images associated with the plurality of product images, wherein a plurality of workpieces and a plurality of label holders carrying associated labels are placed on a platform. The composite image can include a first image plane and a second image plane, wherein the plurality of product images are stored in the first image plane, wherein the plurality of label images are stored in the second image plane, wherein the first image plane and the second image plane are respectively associated with the first power level and the second power level of the laser beam. The method can further include setting the first power level of the laser beam at the laser head driver by the power controller to reproduce the product images stored in the first image plane on the plurality of workpieces; and setting the second power level of the laser beam at the laser head driver by the power controller to reproduce the label images stored in the second image plane on the plurality of labels. The plurality of product images and the plurality of label images can be stored in a common image plane, the method further comprising dynamically setting power level of the laser beam at the laser head driver by the power controller before the laser head scans across the plurality of workpieces or the plurality of labels. The method can further include scanning the laser head by the transport system across the platform line by line; and dynamically setting power level of the laser beam at the laser head driver by the power controller within each line before the laser head scans across one of the plurality of workpieces or one of the plurality of labels. The scanning the laser head across the workpiece comprises moving the laser head, or moving the workpiece, or a combination thereof. The method can further include attaching the label to a top surface of a label holder placed on the platform, wherein the label holder is placed next to the work piece.

These and other aspects, their implementations and other features are described in details in the drawings, the description and the claims.

DETAILED DESCRIPTION OF THE INVENTION

Figure 2:
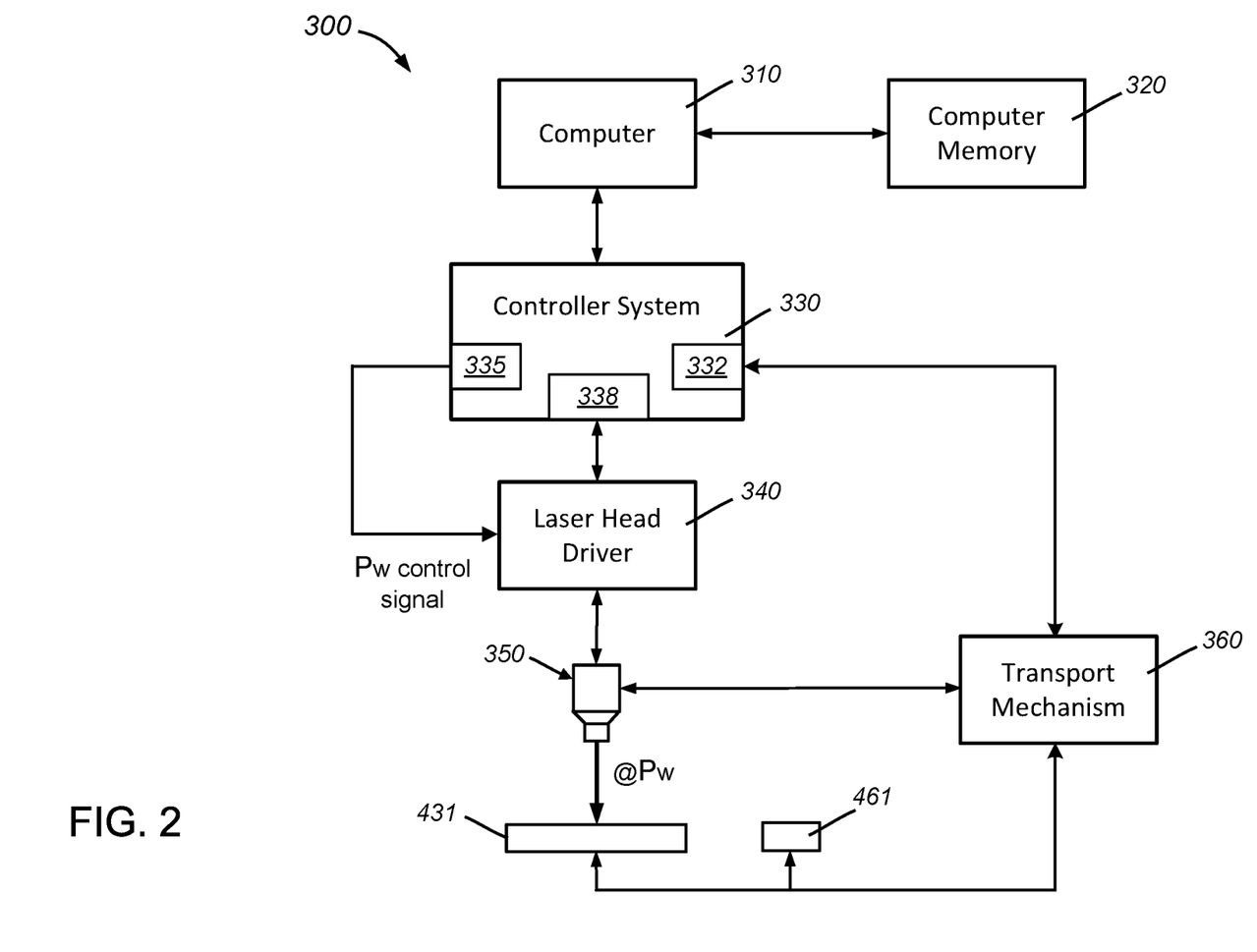
FIG. 2 is a block diagram of a laser etching system for laser etching a workpiece in accordance with the present invention.
Figure 3:
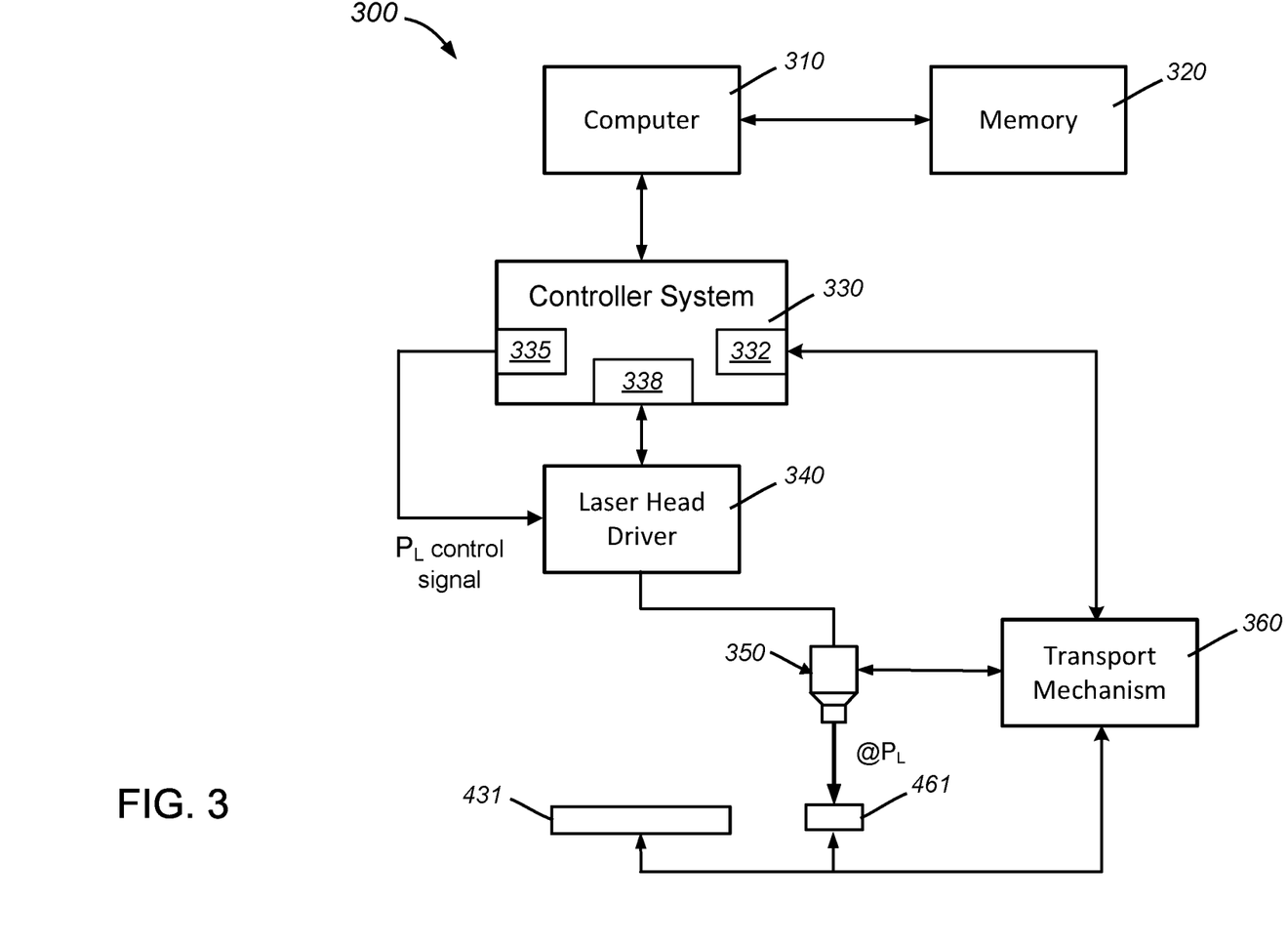
FIG. 3 is a block diagram of the laser etching system for laser etching a label for the workpiece in accordance with the present invention.
Figure 4:
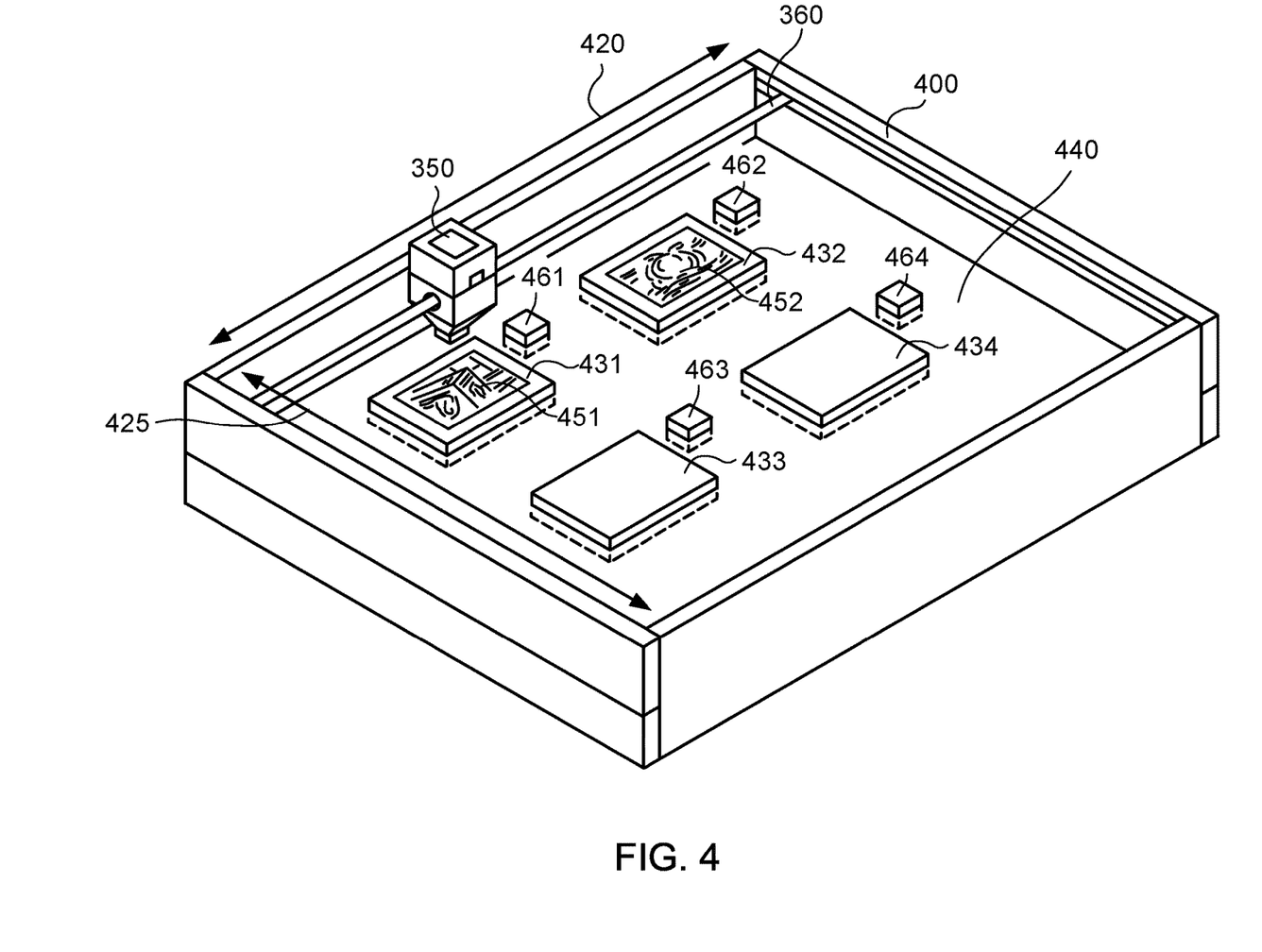
FIG. 4 illustrates an exemplified laser etching system including workpieces and tracking labels in accordance with the present invention.

Referring to FIGS. 2-4, a laser etching system 300 includes a computer 310 and a computer memory 320. The computer 310 receives product images intended to be reproduced on the workpieces using laser etching technologies. The computer 310 can also generate label images for tracking the workpieces. A controller system 330 is communication with the computer 310 and is configured to control a laser etching apparatus 400. The controller system 330 includes a transport controller 332, a power controller 335, and a label and product image processor 338. In the present disclosure, the term product image can include photographic images provided by customers or a service provider, graphic designs, and artwork (including drawings, indicia, text, symbols, etc.) used to decorate final product by laser etching.

The laser etching apparatus 400 includes a laser head driver 340, a laser head 350 and a transport mechanism 360.

Workpieces 431-434 and label holders 461-464 are placed in pairs on a platform 440 in the laser etching apparatus 400. Each of the label holders 461-464 is associated with one of the workpieces 431-434 and is placed next to the corresponding label holder 461, 462, 463, or 464. The transport mechanism 360 can move the laser head 350 along x-direction 420 and the y-direction 425 under the control of the transport controller 332. The laser head 350 can be moved over a workpiece 431 (as shown in FIG. 2), or over a label holder 461 (as shown in FIG. 3).

Figure 5A:
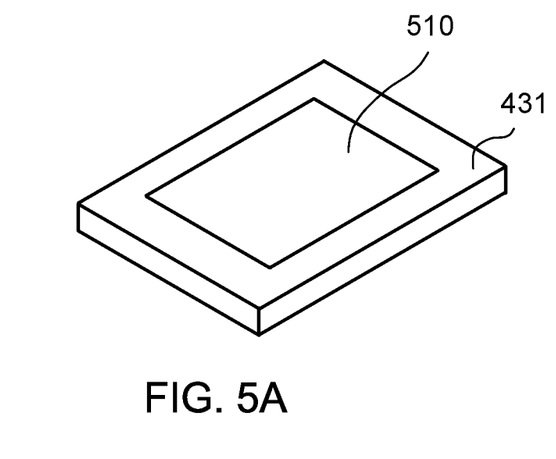
FIGS. 5A-5C illustrate exemplified configurations how tracking labels are attached to label holders compatible with the laser etching system in accordance with the present invention.
Figure 5B:
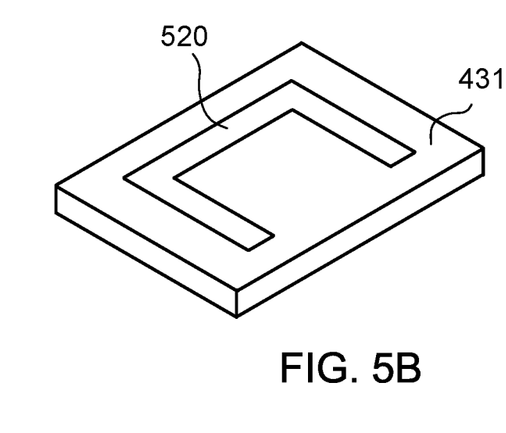
Figure 5C:
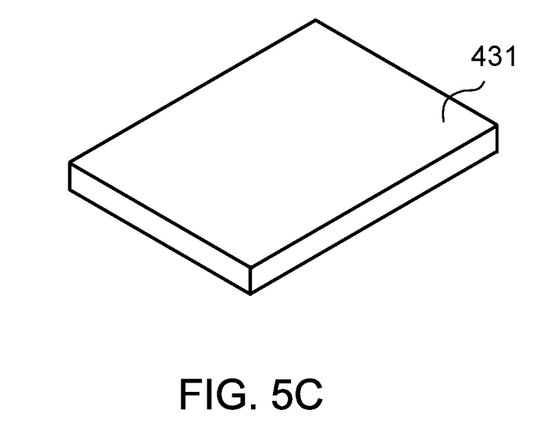

The label holders 461-464 can be made from a solid material and have thicknesses similar to those of the workpieces 431-434. Thus, the labels 500 and the top surfaces of the label holders 461-464 are at about the same height as the top surfaces of the workpieces 431-434. A label can be attached to or printed on the top surface of each of the label holders 461-464. In some embodiments, as shown in FIGS. 5A-5C, the label 500 can include a peelable self-adhesive backing that is stuck to the top surface of the label holder 431 (FIG. 5A). Alternatively, the label holder 431 can include a retainer 520 on its top surface (FIG. 5B). A label can be inserted into the retainer 520 to be fixedly held to the top surface of the label holder 431. A single label can be placed under the retainer 520 so that is keeps the label stock flat (due to some materials that may have a 'curl'). In some embodiments, referring to FIG. 5C, the label holder 431 includes small perforation holes that are connected to a vacuum system, which can produce a negative pressure to hold a label to the surface of 431.

The laser head 350 can be moved by the transport mechanism 360 under the control of the transport controller 332, to scan the top surfaces of the workpieces 431-434 (as shown in FIG. 2) as well as the label holders 461-464 (as shown in FIG. 3).

The label and product image processor 338 processes the product images in preparation for laser etching, which can include resizing the product images to the sizes suitable for the dimensions of the workpieces. The product images can also be rendered to achieve certain image effects on the particular material type (e.g. glass, stone, wood, metal, etc.) of the workpieces. The label and product image processor 338 also preprocesses the label images for tracking the workpieces, which can include a thumbnail version of the image and a machine code such as a barcode or 2D matrix code. Both the product images and the label images are converted to pixel resolution(s) compatible with the scanning resolution of the laser head 350.

The laser head driver 340 provides power and power modulation to the laser head 350. The power modulation can be based on the pixel values of the pre-processed images produced by the label and product image processor 338.

In accordance with the present invention, the power controller 335 is configured to set the power level of the laser head driver 340 to accommodate laser etching on workpieces 431-434 (shown in FIG. 2) or laser etching on the label holders 461-464 (shown in FIG. 3). Before the laser head 350 starts etching an image on a workpiece (431-434), the power controller 335 sets the power level of the laser head driver 340 to $P_w$, which is selected to etch and remove or fracture materials from the particular material composition of the workpiece (e.g. glass, wood, stone, metal, plastic, etc.), at the specific power level set which is consistent with the desired output on the workpiece. In the present disclosure, the power level of the laser head driver 340 can be defined by the maximum, the average, or other relative magnitude for the next period of laser etching.

After the laser head 350 is position above an image forming area in a workpiece 431 (shown in FIG. 2), the laser head 350 emits a laser beam that is modulated by the laser head driver 340 in accordance with the product image. The laser beam selectively heats and burns certain locations of the workpieces 431-434 in a pixel wise fashion, and fractures or removes materials off the workpiece 431 to form an image pattern 451 (or 452) that mimics the product image is created on the top surfaces of the workpiece 431.

Before the laser head 350 starts etching an image on a label on a label holder (461-464), the power controller 335 sets the power level of the laser head driver 340 to $P_L$. In many situations, especially when the label is formed by a sheet of paper, $P_L$ is lower than $P_w$. In other words, it takes less power to burn marks on paper than on the solid materials that forms the workpiece.

After the laser head 350 is positioned above a label holder 461 (shown in FIG. 3), the laser head 350 emits a laser beam that is modulated by the laser head driver 340 in accordance with a label image. The laser beam selectively heats and makes burn marks at different locations of the label in a pixel wise fashion, to form a label image. Similar to those shown in FIG. 2, a label image can include a thumbnail version of the product image, which is reproduced on the workpiece, and a machine code that uniquely identifies the workpiece.

It should be noted that the transport controller can produce relative movements between the transport mechanism and the workpieces and the labels for scanning and reproducing product and label images on the workpieces and the labels. Such relative movements can be produced by moving the laser head, or the workpieces and the labels, or a combination thereof. Thus, in some configurations, the transport mechanism 360 can also move the workpiece 431 and the label holder 461 (directly or by moving a platen or the platform on which the workpiece 431 and the label holder 461 are placed).

In some embodiments, the label and product image processor 338 combines all of the data (e.g. artwork, image, label image & barcode) for workpiece decoration and workpiece tracking as a single composite image. Referring to FIGS. 2-6, a single composite image 600 includes an origin 601 and covers most of the working area in the platform 440. The single composite image 600 includes product images 651-654 and label images 671-674. The product images 651-654 are used to produce image patterns (e.g. 451, 452) on the work pieces 431-434. The label images 671-674 include product tracking information and are to be reproduced on the tracking labels on the label holders 461-464. The image patterns and label image can be laser etched respectively on workpieces and tracking labels in one batch operation. These product images 651-654 and the label images 671-674 are respectively registered to the physical positions of the workpieces 431-434 and their respectively associated label holder 461-464. The spaces outside of the workpieces 431-434 and the label holders 461-464 correspond to the blank areas in the composition image 600 that do not receive laser etching. The transport controller 332 commands the transport mechanism 360 to move the laser head 350 to a known home position within the platform 440. The home position corresponds to the origin 601 in the composite image 600. The laser etching patterns are thus correctly aligned to the workpieces 431-434 and label holders 461-464.

Figure 6:
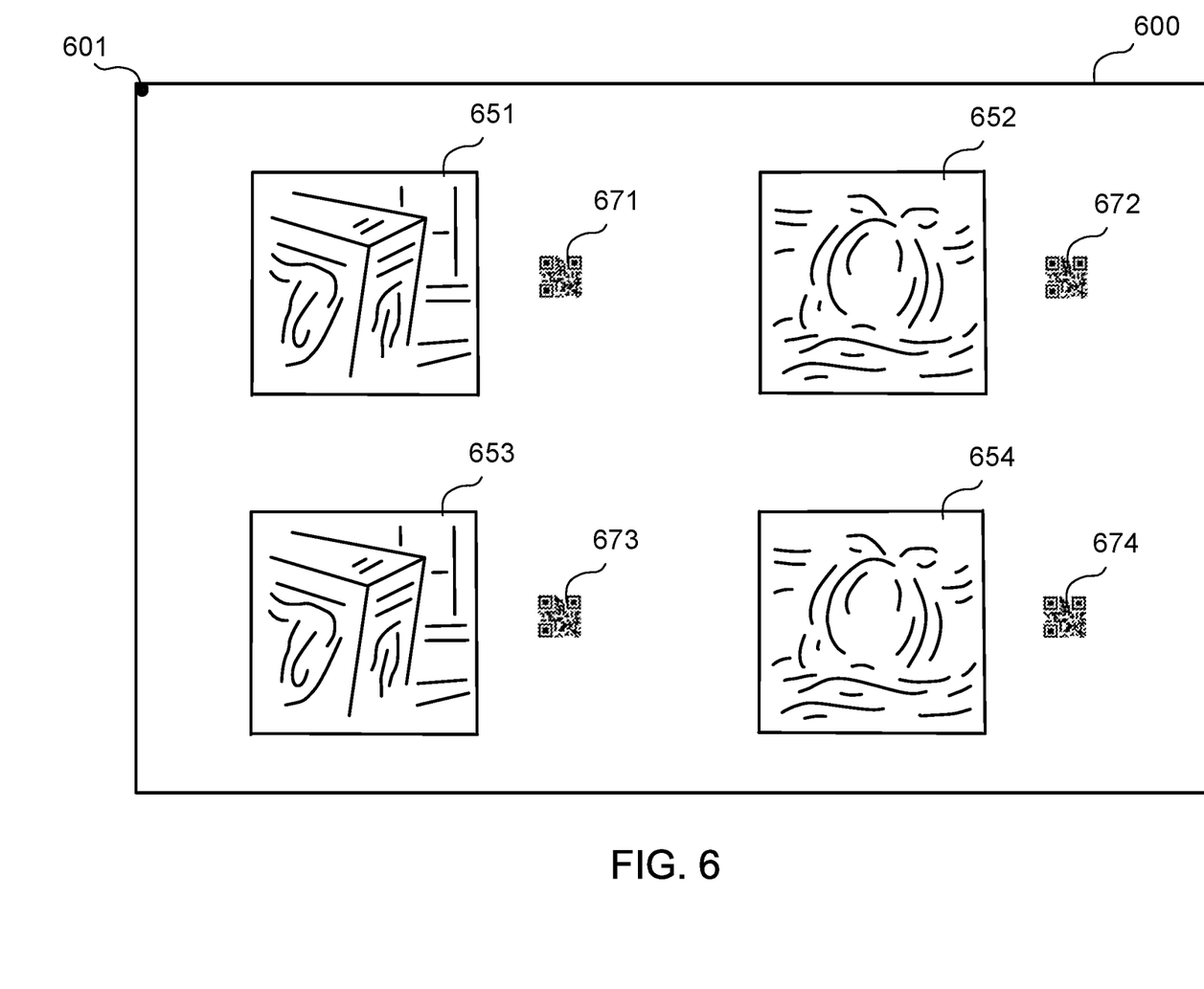
FIG. 6 shows a composite image spanning the platform of the disclosed laser etching apparatus and comprising a plurality of product images and a plurality of associated label images.

In some embodiments, the product images 651-654 and the label images 671-674 are contained in separate image planes with a first image plane associated with power level $P_w$ and a second image plane associated with power level $P_L$.

The laser head driver 340 can be moved and controlled to etch one image plane at a time. The power controller 335 automatically sets the laser head driver 340 to power level $P_w$ before laser etching of the first image plane, and sets the laser head driver 340 to power level $P_L$ before laser etching of the second image plane.

In some embodiments, the power levels $P_w$ and $P_L$ of laser etching can be represented by code values within a same image plane in the composite image 600. For example, if power levels of the laser head 350 is quantized to 0-255 levels with high code values associated with higher laser power, $P_w$ can correspond to the level of 220 for certain workpiece material such as glass; $P_L$ can correspond to the level of 50 for track label material such as certain type of pulp or synthetic paper. The power controller 335 automatically sets the power level of the laser head driver 340 as the laser head driver 340 is moved to areas occupied by the workpieces 431-434 and the label holders 461-464.

Figure 7:
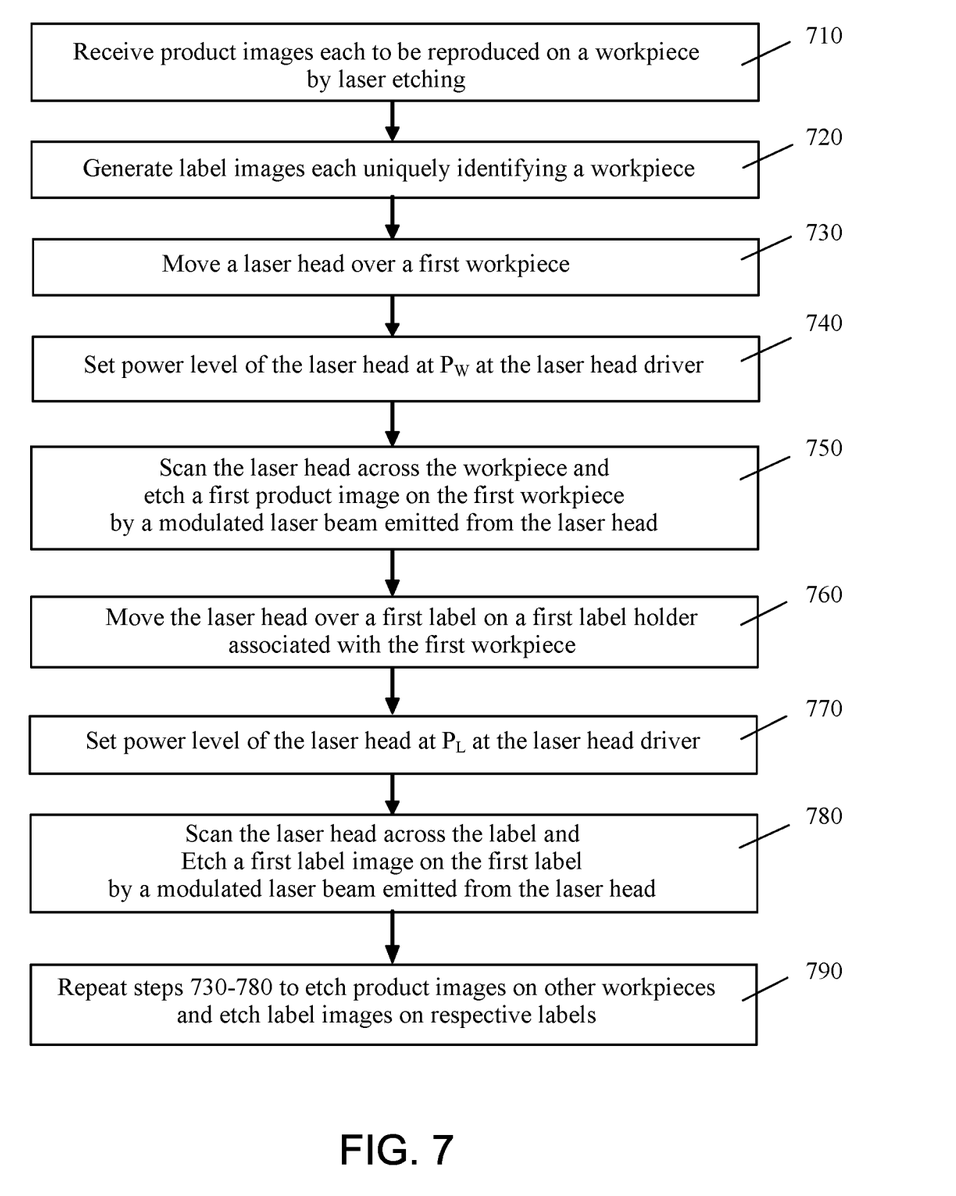
FIG. 7 is a flowchart illustrating the operation of the laser etching system in accordance with the present invention.

The presently disclosed laser etching system can be operated in one or more of the following steps: referring to FIG. 7, product images are received by a computer (step 710). Each product image is to be reproduced on a workpiece by laser etching. Label images are generated by the computer (step 720). Each label image uniquely identifies a workpiece. One or more workpieces and labels are placed on a platform in a laser etching apparatus. A laser head is first stationed at the home position over the platform of the laser etching apparatus, and then moved over a first workpiece by a transport mechanism (step 730). The power level of the laser head is set at $P_w$ by a power controller at a laser head driver (step 740). The laser head is scanned across the workpiece. A first product image is etched on the first workpiece by a modulated laser beam emitted from the laser head (step 750). As described above, the laser beam is modulated in accordance with the product image in a pixel wise fashion across the workpiece. The laser head is moved over a first label on a first label holder associated with the first workpiece (step 760). The power level of the laser head is set by the power controller at $P_L$ at the laser head driver (step 770). The laser head is scanned across the label. A first label image is etched on the first label by a laser beam emitted from the laser head (step 780). The laser beam is modulated in accordance with the label image in a pixel wise fashion across the label.

Steps 730-780 are repeated to etch product images on other workpieces and etch label images on labels associated with respective workpieces (step 790). As discussed above, in some embodiments, the product images (and associated image patterns) and the label images can be stored in separate image planes in a single composite image with the origin of composite image corresponding to the home position. Steps 730-750 can be repeated with the power level set once at the $P_w$ level for the image plane for product images. Similarly, steps 760-780 can be repeated with the power level set once at the $P_L$ level for the image plane for label images.

In some embodiments, the power levels $P_w$ and $P_L$ of laser etching can be represented by code values within a same image plane in the composite image. Steps 730-780 are alternately repeated to etch product images and label images on different pairs of workpieces and labels. Specifically, the power level can automatically be set to an appropriate level along each scan line (along the x direction in FIG. 4) as the laser head is moved by the transport mechanism into a workpiece area or a label area. After one scan line is finished, the laser head is moved (in the y-direction in FIG. 4) by the transport mechanism to the next scan line. Lines without etching operations (e.g. with all zero code values) can be skipped and the laser head is moved in the y-direction until a line with etching data is found.

Only a few examples and implementations are described. Other implementations, variations, modifications and enhancements to the described examples and implementations may be made without deviating from the spirit of the present invention. For example, the disclosed deposition apparatus is compatible with other types of mechanism for holding a label onto a label holder. In some cases, the label holders themselves can serve as labels. Moreover, the transport mechanism can be implemented in other configurations to create relative movements between the laser head across and the workpieces and labels on the platform. For example, instead of moving the laser head, the workpieces and labels can be moved by the transport mechanism to bring individual workpieces and labels to the laser head.

Furthermore, the laser head can move over workpieces and labels in a way that the power level is modulated to different power levels for each article but the laser moves in a continuous x-direction motion across the entire platform, advancing one line at a time in the y-direction. In addition, the same applies to a laser system that etches a cylindrical workpiece and label system where the laser head only moves in the x-direction but the cylindrical articles are rotated one line at a time in the y-direction, centered beneath the laser head.

What is claimed is:

1. A laser etching system comprising:
    a platform comprising a workpiece associated with a label holder, the workpiece configured to have a product image printed thereon, and the label holder configured to have a label image printed thereon;
    an image processor configured to produce the product image and the label image associated with the product image;
    a laser head configured to emit a laser beam;
    a laser head driver configured to modulate the laser beam; and
    a transport system configured to move the laser head across an x-axis and a y-axis of the platform to scan the laser head across the product image and the label image.

2. The laser etching system of claim 1, wherein the laser head driver is configured to modulate the laser beam at a first power level in accordance with the product image to etch the product image on the platform.

3. The laser etching system of claim 2, wherein the laser head driver is configured to modulate the laser beam at a second power level in accordance with the label image to etch the label image adjacent to the product image on the platform.

4. The laser etching system of claim 3, wherein the product image and the label image are etched on the platform in a single batch.

5. The laser etching system of claim 4, further comprising:
    a power controller configured to automatically set the power level of the laser head based on the laser head being moved to a location where the product image or the label image is to be etched on the platform.

6. The laser etching system of claim 5, wherein the product image and the label image are stored in a common image plane, wherein the power controller is configured to dynamically set the power level of the laser beam during a single scan movement in the common image plane before the laser head scans across the product image or the label image.

7. The laser etching system of claim 6, wherein the transport system is configured to scan the laser head across the platform pixel line by pixel line, wherein the power controller dynamically sets the power level of the laser beam within each pixel line before the laser head scans across the product image or the label image.

8. The laser etching system of claim 1, further comprising:
a computer configured to receive the product image to be reproduced on the platform, wherein the computer is configured to label information that uniquely identifies the product image, and wherein the label image comprises the label information.

9. The laser etching system of claim 3, wherein the image processor is configured to produce a composite image comprising the product image and the label image such that the product image and the label image are respectively etched on the platform in a single batch.

10. The laser etching system of claim 9, wherein the composite image includes a first image plane and a second image plane, wherein the product image is stored in the first image plane, wherein the label image is stored in the second image plane, and wherein the first image plane and the second image plane are respectively associated with the first power level and the second power level of the laser beam.

11. The laser etching system of claim 1, wherein the label is attached to a surface of a label holder positioned on the platform.

12. A method for laser etching comprising:
receiving a product image and a label image associated with the product image from an image processor;
scanning a laser head across an x-axis and a y-axis of a platform with a transport system, wherein the product image and the label image are to be placed on the platform, the platform comprising a workpiece associated with a label holder, the workpiece configured to have a product image printed thereon, and the label holder configured to have a label image printed thereon;
emitting a laser beam from the laser head, the laser beam configured to etch the product image and the label image on the platform;
modulating the laser beam with a laser head driver; and etching the product image and the label image on the platform.

13. The method of claim 12, wherein the laser head driver is configured to modulate the laser beam at a first power level in accordance with the product image to etch the product image on the platform.

14. The method of claim 13, wherein the laser head driver is configured to modulate the laser beam at a second power level in accordance with the label image to etch the label image adjacent to the product image on the platform.

15. The method of claim 14, wherein etching the product image and the label image on the platform occurs in a single batch.

16. The method of claim 15, further comprising:
automatically setting a power level of the laser head with a power controller based on the laser head being moved to a location where the product image or the label image is to be etched on the platform.

17. The method of claim 16, wherein the product image and the label image are stored in a common image plane, wherein the power controller is configured to dynamically set the power level of the laser beam during a single scan movement in the common image plane before the laser head scans across the product image or the label image.

18. The method of claim 17, wherein scanning the laser head across the platform comprises scanning the laser head across the platform pixel line by pixel line, wherein the power controller dynamically sets a power level of the laser beam within each pixel line before the laser head scans across the product image or the label image.

19. The method of claim 14, further comprising producing a composite image with the image processor, wherein the composite image comprises the product image and the label image such that the product image and the label image are respectively etched on the platform in a single batch.

20. The method of claim 19, wherein the composite image includes a first image plane and a second image plane, wherein the product image is stored in the first image plane, wherein the label image is stored in the second image plane, and wherein the first image plane and the second image plane are respectively associated with the first power level and the second power level of the laser beam.

* * * * *